US008018626B2

(12) United States Patent
Kiwada

(10) Patent No.: US 8,018,626 B2
(45) Date of Patent: Sep. 13, 2011

(54) IMAGE FORMING METHOD AND COUNT CONTROL METHOD

(75) Inventor: Masakatsu Kiwada, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 614 days.

(21) Appl. No.: 12/128,293

(22) Filed: May 28, 2008

(65) Prior Publication Data

US 2009/0141930 A1 Jun. 4, 2009

(30) Foreign Application Priority Data

Dec. 3, 2007 (JP) ................................. 2007-312126

(51) Int. Cl.
*H04N 1/40* (2006.01)
(52) U.S. Cl. ...................... 358/3.28; 358/1.13
(58) Field of Classification Search .................. 358/1.1, 358/1.9, 3.28, 1.13
See application file for complete search history.

(56) References Cited

U.S. PATENT DOCUMENTS

| 6,243,480 | B1 * | 6/2001 | Zhao et al. ..................... 382/100 |
| 6,331,899 | B1 * | 12/2001 | Samadani ....................... 358/1.9 |
| 7,599,078 | B2 * | 10/2009 | Sano ............................. 358/1.13 |
| 2008/0080000 | A1 * | 4/2008 | Kadota ......................... 358/1.15 |

FOREIGN PATENT DOCUMENTS

| JP | 53-142237 | 12/1978 |
| JP | 54-74125 | 6/1979 |
| JP | 2005-078035 | 3/2005 |

OTHER PUBLICATIONS

Japanese Office Action dated Oct. 7, 2009.

\* cited by examiner

*Primary Examiner* — Thomas D Lee
(74) *Attorney, Agent, or Firm* — Finnegan, Henderson, Farabow, Garrett & Dunner, LLP

(57) ABSTRACT

An image forming apparatus which copies on a recording sheet an original document carrying a watermark, where a watermark comprising a specific character or a pattern is embedded inconspicuously into an image of the original document, the image forming apparatus including: a discrimination section which discriminates a color mode of the original document and a color of the watermark; and a counting section which counts a number of copied sheets as monochrome printing in cases where the discrimination section has discriminated the color mode of the original document as monochrome and has discriminated the color of the watermark as colored.

16 Claims, 9 Drawing Sheets

FIG. 4

PRINT JOB

JOB INFORMATION

| JOB ID | 00009317 |
|---|---|
| JOB TYPE | PRINT |
| USER NAME | KIWADA |
| JOB NAME | patent. doc |
| PAGE NUMBER | 12 |
| SET NUMBER | 1 |
| BINDING DIRECTION | LEFT BINDING |
| STAPLE | 2 POSITIONS |
| ⋮ | ⋮ |

PAGE INFORMATION

| PAGE NUMBER | 1 |
|---|---|
| IMAGE SIZE | 292x205 mm |
| PAPER SIZE | 297x210 mm |
| PAPER TYPE | PLAIN PAPER |
| COLOR MODE | MONOCHROME |
| IMAGE DIRECTION | PORTRAIT |
| DESIGNATION OF PAPER FEEDING SECTION | PAPER FEEDING SECTION 1 |
| SINGLE SIDED/DOUBLE SIDED | SINGLE SIDED |
| WATERMARK | ON |
| WATERMARK CHARACTER STRING | FOR INTERNAL USE ONLY |
| WATERMARK PATTERN | ARABESQUE |
| WATERMARK COLOR | CYAN |
| ⋮ | ⋮ |

PAGE INFORMATION

| PAGE NUMBER | 2 |
|---|---|
| IMAGE SIZE | 292x205 mm |
| PAPER SIZE | 297x210 mm |
| PAPER TYPE | PLAIN PAPER |
| COLOR MODE | MONOCHROME |
| IMAGE DIRECTION | PORTRAIT |
| DESIGNATION OF PAPER FEEDING SECTION | PAPER FEEDING SECTION 1 |
| SINGLE SIDED/DOUBLE SIDED | SINGLE SIDED |
| WATERMARK | ON |
| WATERMARK CHARACTER STRING | FOR INTERNAL USE ONLY |
| WATERMARK PATTERN | ARABESQUE |
| WATERMARK COLOR | CYAN |
| ⋮ | ⋮ |

COUNTER INFORMATION

| COUNTER | NUMBER OF SHEETS |
|---|---|
| TOTAL | 700 |
| COLOR | 200 |
| MONOCHROME | 500 |
| TOTAL COPY | 300 |
| COLOR COPY | 100 |
| MONOCHROME COPY | 200 |
| TOTAL PRINT | 400 |
| COLOR PRINT | 100 |
| MONOCHROME PRINT | 300 |

FIG. 5 (b)

(EXAMPLE) THE CASE OF PRINTING MONOCHROME DOCUMENT WITH COLOR WATERMARK

| COUNTER | NUMBER OF SHEETS |
|---|---|
| TOTAL | 701 |
| COLOR | 200 |
| MONOCHROME | 501 |
| TOTAL COPY | 300 |
| COLOR COPY | 100 |
| MONOCHROME COPY | 200 |
| TOTAL PRINT | 401 |
| COLOR PRINT | 100 |
| MONOCHROME PRINT | 301 |

FIG. 6 (a)

COUNTER INFORMATION

| COUNTER | NUMBER OF SHEETS |
|---|---|
| TOTAL | 700 |
| COLOR | 200 |
| MONOCHROME | 500 |
| TOTAL COPY | 300 |
| COLOR COPY | 100 |
| MONOCHROME COPY | 200 |
| TOTAL PRINT | 400 |
| COLOR PRINT | 100 |
| MONOCHROME PRINT | 300 |
| SECURITY TOTAL | 50 |
| SECURITY (WATERMARK) | 10 |
| SECURITY (AUTHENTICATION) | 20 |
| ⋮ | |

FIG. 6 (b)

(EXAMPLE) THE CASE OF PRINTING MONOCHROME DOCUMENT WITH COLOR WATERMARK

| COUNTER | NUMBER OF SHEETS |
|---|---|
| TOTAL | 701 |
| COLOR | 200 |
| MONOCHROME | 501 |
| TOTAL COPY | 300 |
| COLOR COPY | 100 |
| MONOCHROME COPY | 200 |
| TOTAL PRINT | 401 |
| COLOR PRINT | 100 |
| MONOCHROME PRINT | 301 |
| SECURITY TOTAL | 51 |
| SECURITY (WATERMARK) | 11 |
| SECURITY (AUTHENTICATION) | 20 |
| ⋮ | |

FIG. 8

PRINT JOB

JOB INFORMATION

| JOB ID | 00009317 |
|---|---|
| JOB TYPE | PRINT |
| USER NAME | KIWADA |
| JOB NAME | patent. doc |
| PAGE NUMBER | 12 |
| SET NUMBER | 1 |
| BINDING DIRECTION | LEFT BINDING |
| STAPLE | 2 POSITIONS |
| ⋮ | ⋮ |

PAGE INFORMATION

| PAGE NUMBER | 1 |
|---|---|
| IMAGE SIZE | 292x205 mm |
| PAPER SIZE | 297x210 mm |
| PAPER TYPE | PLAIN PAPER |
| COLOR MODE | MONOCHROME |
| IMAGE DIRECTION | PORTRAIT |
| DESIGNATION OF PAPER FEEDING SECTION | PAPER FEEDING SECTION 1 |
| SINGLE SIDED/DOUBLE SIDED | SINGLE SIDED |
| WATERMARK | PREDETERMINED |
| WATERMARK CHARACTER STRING | PREDETERMINED |
| WATERMARK PATTERN | PREDETERMINED |
| WATERMARK COLOR | PREDETERMINED |
| ⋮ | ⋮ |

PAGE INFORMATION

| PAGE NUMBER | 2 |
|---|---|
| IMAGE SIZE | 292x205 mm |
| PAPER SIZE | 297x210 mm |
| PAPER TYPE | PLAIN PAPER |
| COLOR MODE | MONOCHROME |
| IMAGE DIRECTION | PORTRAIT |
| DESIGNATION OF PAPER FEEDING SECTION | PAPER FEEDING SECTION 1 |
| SINGLE SIDED/DOUBLE SIDED | SINGLE SIDED |
| WATERMARK | PREDETERMINED |
| WATERMARK CHARACTER STRING | PREDETERMINED |
| WATERMARK PATTERN | PREDETERMINED |
| WATERMARK COLOR | PREDETERMINED |
| ⋮ | ⋮ |

COUNTER INFORMATION

| COUNTER | NUMBER OF SHEETS |
|---|---|
| TOTAL | 700 |
| COLOR | 200 |
| MONOCHROME | 500 |
| TOTAL COPY | 300 |
| COLOR COPY | 100 |
| MONOCHROME COPY | 200 |
| TOTAL PRINT | 400 |
| COLOR PRINT | 100 |
| MONOCHROME PRINT | 300 |

FIG. 9 (b)

(EXAMPLE) THE CASE OF PRINTING MONOCHROME DOCUMENT WITH WATERMARK OTHER THAN PREDETERMINED (MONOCHROME)

| COUNTER | NUMBER OF SHEETS |
|---|---|
| TOTAL | 701 |
| COLOR | 201 |
| MONOCHROME | 500 |
| TOTAL COPY | 300 |
| COLOR COPY | 100 |
| MONOCHROME COPY | 200 |
| TOTAL PRINT | 401 |
| COLOR PRINT | 101 |
| MONOCHROME PRINT | 300 |

FIG. 10 (a)

COUNTER INFORMATION

| COUNTER | NUMBER OF SHEETS |
|---|---|
| TOTAL | 700 |
| COLOR | 200 |
| MONOCHROME | 500 |
| TOTAL COPY | 300 |
| COLOR COPY | 100 |
| MONOCHROME COPY | 200 |
| TOTAL PRINT | 400 |
| COLOR PRINT | 100 |
| MONOCHROME PRINT | 300 |
| PRINT OTHER THAN PREDETERMINED | 50 |

FIG. 10 (b)

(EXAMPLE) THE CASE OF PRINTING MONOCHROME DOCUMENT WITH WATERMARK OTHER THAN PREDETERMINED (MONOCHROME)

| COUNTER | NUMBER OF SHEETS |
|---|---|
| TOTAL | 700 |
| COLOR | 200 |
| MONOCHROME | 500 |
| TOTAL COPY | 300 |
| COLOR COPY | 100 |
| MONOCHROME COPY | 200 |
| TOTAL PRINT | 400 |
| COLOR PRINT | 100 |
| MONOCHROME PRINT | 300 |
| PRINT OTHER THAN PREDETERMINED | 51 |

FIG. 11

PREDETERMINED SETTING (EXAMPLE)

| | PREDETERMINED | (EXAMPLE OTHER THAN PREDETERMINED) |
|---|---|---|
| WATERMARK | ON | OFF |
| WATERMARK CHARACTER STRING | FOR INTERNAL USE ONLY | COPY, COPY PROHIBITED, ... |
| WATERMARK PATTERN | ARABESQUE | CHERRY PATTERN, LATTICE, ... |
| WATERMARK COLOR | CYAN | MAGENTA, BLACK, ... |

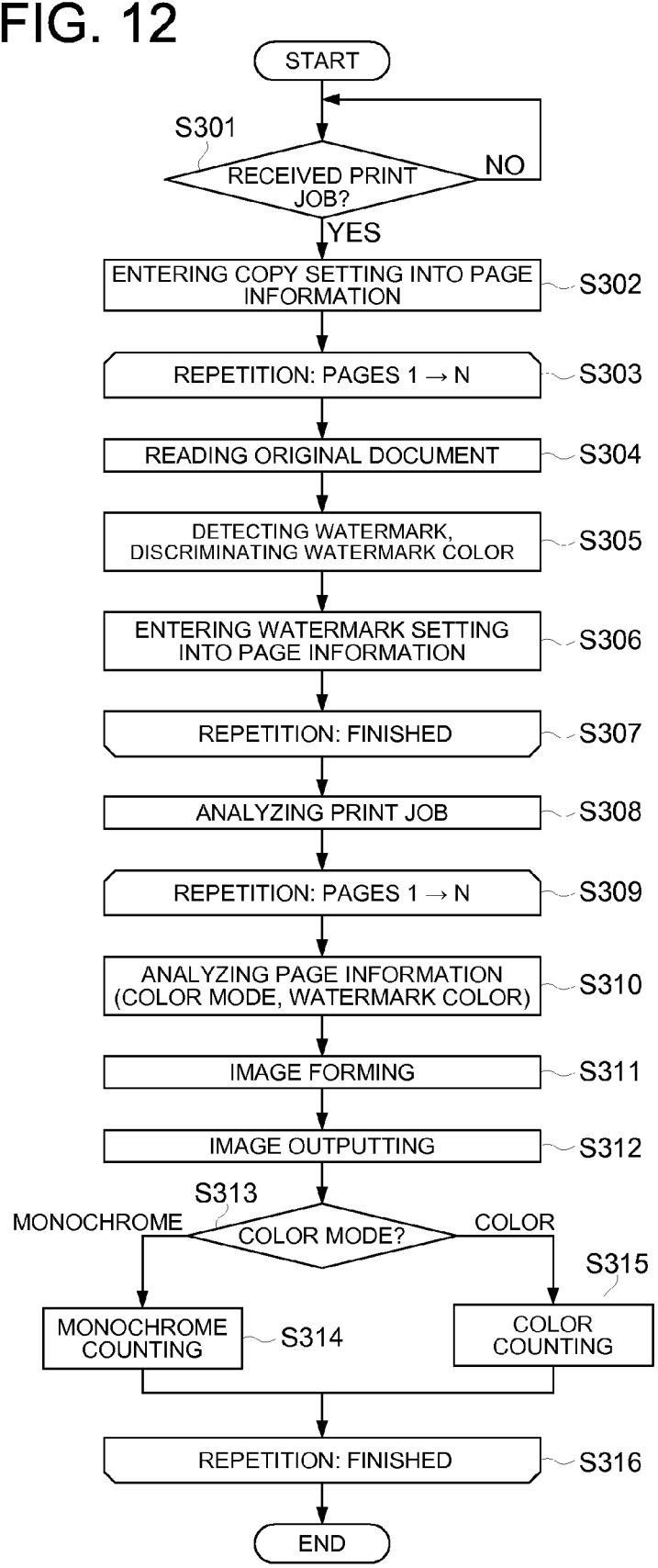

FIG. 13

PRINT JOB (← COPY SETTING)

JOB INFORMATION

| JOB ID | 00009317 |
|---|---|
| JOB TYPE | COPY |
| USER NAME | OPERATOR |
| JOB NAME | COPY |
| PAGE NUMBER | UNKNOWN |
| SET NUMBER | 1 |
| BINDING DIRECTION | LEFT BINDING |
| STAPLE | 2 POSITIONS |
| ⋮ | ⋮ |

PAGE INFORMATION

| PAGE NUMBER | 1 |
|---|---|
| IMAGE SIZE | 292x205 mm |
| PAPER SIZE | 297x210 mm |
| PAPER TYPE | PLAIN PAPER |
| COLOR MODE | MONOCHROME |
| IMAGE DIRECTION | PORTRAIT |
| DESIGNATION OF PAPER FEEDING SECTION | PAPER FEEDING SECTION 1 |
| SINGLE SIDED/DOUBLE SIDED | SINGLE SIDED |
| WATERMARK | EXISTING |
| WATERMARK COLOR | COLORED |
| ⋮ | ⋮ |

PAGE INFORMATION

| PAGE NUMBER | 2 |
|---|---|
| IMAGE SIZE | 292x205 mm |
| PAPER SIZE | 297x210 mm |
| PAPER TYPE | PLAIN PAPER |
| COLOR MODE | MONOCHROME |
| IMAGE DIRECTION | PORTRAIT |
| DESIGNATION OF PAPER FEEDING SECTION | PAPER FEEDING SECTION 1 |
| SINGLE SIDED/DOUBLE SIDED | SINGLE SIDED |
| WATERMARK | EXISTING |
| WATERMARK COLOR | COLORED |
| ⋮ | ⋮ |

⋮

IMAGE FORMING METHOD AND COUNT CONTROL METHOD

CROSS-REFERENCE TO RELATED APPLICATION

The present application is based on Japanese Patent Application No. 2007-312126 filed with Japanese Patent Office on Dec. 3, 2007, the entire content of which is hereby incorporated by reference.

BACKGROUND OF THE INVENTION

1. Field of the Invention

The present invention relates to an image forming apparatus and a count control method, particularly to an image forming apparatus provided with a function of printing a watermark and a count control method of the image forming apparatus.

2. Description of Related Art

Copying machines and MFPs (Multi Function Peripherals), each having a color printing function, are becoming common, and various documents are printed in offices with those machines. Particularly, in cases of printing a document including confidential information, it is required to prevent leakage of such confidential information, so that recent image forming apparatuses are provided with a function known as watermark printing (for example refer to Unexamined Japanese Patent Application Publication Nos. S53-142237, and S54-74125). In the watermark printing, specific characters or patterns are printed to be embedded into an original document so as not to be recognized by the naked eye. Such embedded inconspicuous characters or patterns are called a watermark.

Further, in the case of billing based on a number of printed sheets, the number of color printed sheets and the number of monochrome printed sheets are separately counted because the billing amount is different between color printing and monochrome printing. Therefore, in cases where a color image is included in an original document, the number of sheets is counted as color printing.

However, since the watermark is inconspicuously printed, in the case of printing by embedding the watermark into the original document, or in the case of copying the original document previously embedded with the watermark, various inconveniences arise depending on whether to count as color printing or as monochrome printing.

The present invention has been accomplished in view of the above problem, and its primary object is to provide an image forming apparatus and count control method which are capable of eliminating the inconveniences arising in the case of printing the watermark.

SUMMARY

To achieve at least one of the abovementioned objects, an apparatus, reflecting one aspect of the present invention, is an image forming apparatus which copies on a recording sheet an original document carrying a watermark where a watermark comprising a specific character or a pattern is embedded inconspicuously into an image of the original document, the image forming apparatus comprising: a discrimination section which discriminates a color mode of the original document and a color of the watermark; and a counting section which counts a number of copied sheets as monochrome printing in cases where the discrimination section has discriminated the color mode of the original document as monochrome and has discriminated the color of the watermark as colored.

In the image forming apparatus reflecting another aspect of the present invention, the counting section further counts the number of copied sheets separately as watermark printing in cases where the discrimination section has discriminated the color mode of the original document as monochrome and has discriminated the color of the watermark as colored.

BRIEF DESCRIPTION OF THE DRAWINGS

These and other objects, advantages and features of the invention will become apparent from the following description thereof taken in conjunction with the accompanying drawings in which:

FIG. 4 shows an example of a print job pertaining to the first embodiment of the present invention;

FIGS. 5(a) and 5(b) show examples of counter information pertaining to the first embodiment of the present invention;

FIGS. 6(a) and 6(b) show other examples of the counter information pertaining to the first embodiment of the present invention;

FIG. 8 shows an example of a print job pertaining to the second embodiment of the present invention;

FIGS. 9(a) and 9(b) show examples of the counter information pertaining to the second embodiment of the present invention;

FIGS. 10(a) and 10(b) show other examples of the counter information pertaining to the second embodiment of the present invention;

FIG. 11 shows an example of setting of watermarks pertaining to the second embodiment of the present invention;

FIG. 12 is a flow chart showing a copying procedure using the image forming apparatus pertaining to the third embodiment of the present invention; and FIG. 13 shows an example of a print job pertaining to the third embodiment of the present invention.

DETAILED DESCRIPTION OF THE PREFERRED EMBODIMENT

As shown in the description of the related art, there are cases where, in order to prevent illegal copies, a watermark is printed in an original document. The watermark printing is an image overlay processing to embed a specific character (namely, a copy guard character) or a specific pattern into an original document, which emerges to be clearly regarded as having been copied, in addition, which being made as invisible as possible before copying.

In this way, since the overlay image of the specific character or pattern of the watermark is characteristically not easily being seen by a naked eye, in the count control to count the number of printed sheets, various inconveniences arise depending on whether it is counted as color printing or as monochrome printing.

In order to eliminate the stated inconveniences arising in the case of watermark printing, a control section of the image forming apparatus controls whether to count a job as color printing or as monochrome printing, based on predetermined rules. Each of these embodiments will be explained in detail below.

First Embodiment

Figure 1:
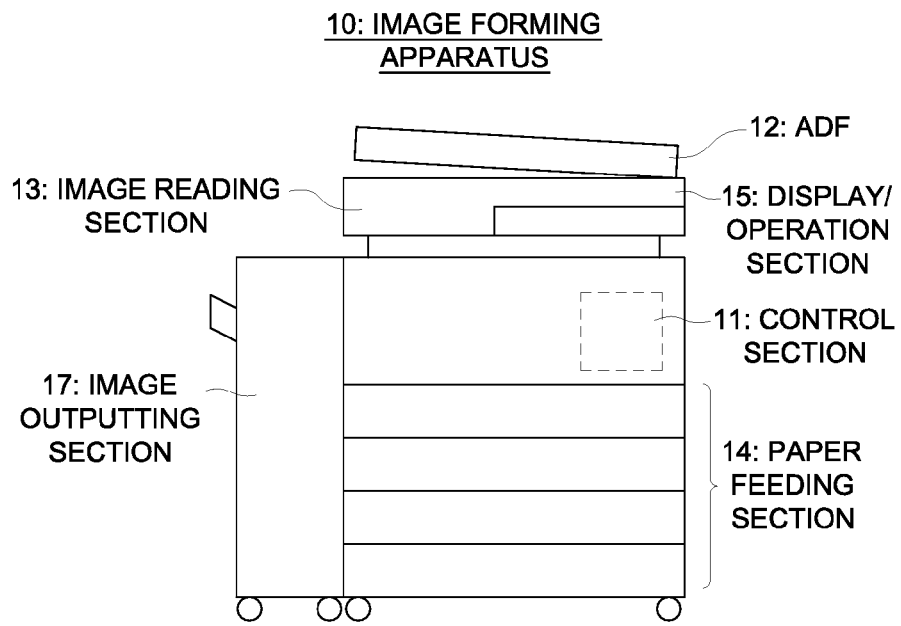
FIG. 1 is a schematic elevation view showing a structure of the image forming apparatus pertaining to the first embodiment of the present invention.

First of all, while referring to FIGS. 1-6, will be explained is an image forming apparatus and a count control method pertaining to the first embodiment. FIG. 1 is a schematic elevation view showing the overall structure of the image forming apparatus pertaining to the first embodiment of the present invention, FIG. 2 is a block diagram showing the structure, FIG. 3 is a flow chart showing a print procedure using the image forming apparatus of the first embodiment, FIG. 4 shows an example of a print job, and FIGS. 5(*a*)-6(*b*) show examples of counter information.

As described above, in the case of printing by embedding a watermark into an original document, various inconveniences arise depending on whether to count a job as color printing or as monochrome printing. For example, in cases where printing is performed by embedding a color watermark into a monochrome original document, since a user recognizes that a monochrome print is outputted, as a result, an inconvenience arises that the print is counted as color printing contrary to the user's intension. In the present embodiment, a method of eliminating this kind of inconvenience is presented.

Figure 2:
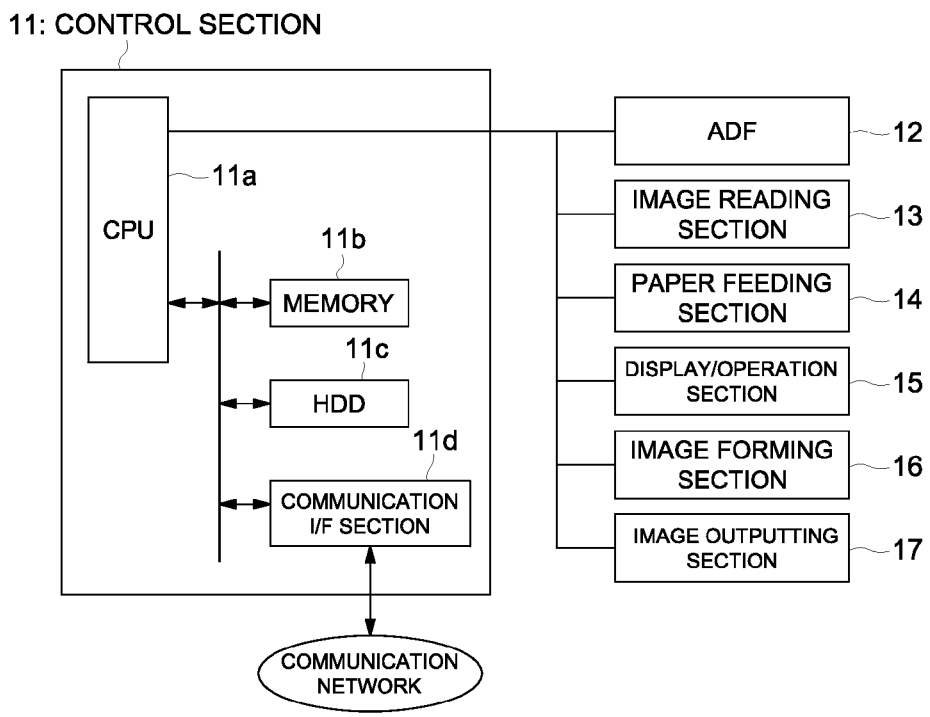
FIG. 2 is a block diagram showing the structure of the image forming apparatus pertaining to the first embodiment of the present invention.
Figure 3:
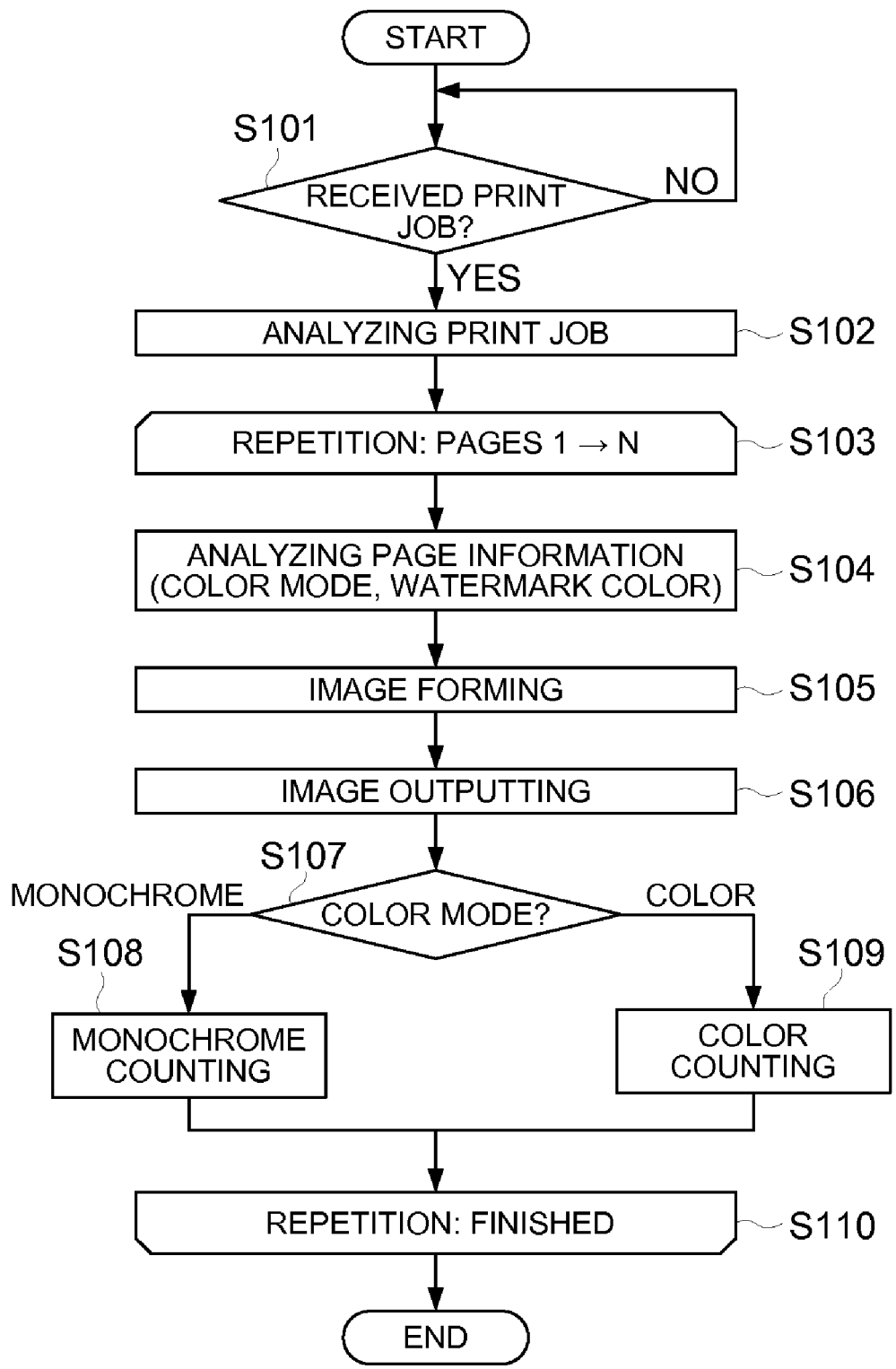
FIG. 3 is a flow chart showing a print procedure using the image forming apparatus pertaining to the first embodiment of the present invention.

As shown in FIGS. 1 and 2, image forming apparatus 10 of the present invention is configured with control section 11, ADF (Auto Document Feeder) 12, image reading section 13, paper feeding section 14, display/operation section 15, image forming section 16, and image outputting section 17, etc.

Control section 11 comprises CPU (Central Processing Unit) 11*a*, memory 11*b* such as ROM (Read Only Memory) and RAM (Random Access Memory), HDD (Hard Disk Drive) 11*c*, and communication I/F (Interface) section 11*d*, etc., which are all connected via a bus.

CPU 11*a* performs control of each section, as well as image processing, etc.

Memory 11*b* temporarily stores various data read from image reading section 13, communication I/F section 11*d*, and HDD 11*c*, and the stored data is processed by CPU 11*a* to be transferred to HDD 11*c* or image forming section 16 as necessary.

HDD 11*c* stores a program for CPU 11*a* to control each section, information regarding processing function of the image forming apparatus, and the watermark pattern, etc., which are read out as necessary and executed on memory 11*b*

Communication I/F section 11*d* establishes the connection to a server, client server, and other apparatus, etc., after which it conducts reception and transmission of data.

Although control section 11 usually controls each constituent section, in the present embodiment the control section 11 functions as a discrimination section which discriminates a color mode of the original document and a color of the watermark, and a counting section which conducts count control to count a number of copied sheets as monochrome printing, in cases where a monochrome original document is printed by embedding a color watermark and such a job is usually counted as a color printing job. Control of the discrimination section and the counting section may be conducted by programs stored in memory 11*b* or HDD 11*c*, or by hardware. The above color mode usually corresponds to the actual color of the original document, but it need not necessarily be identical to the actual color.

ADF 12 automatically feeds a single sheet or plural sheets of original document to image reading section 13.

Image reading section 13 is configured with a light source to scan the original document on the original platen, a CCD (Charge Coupled Device) image sensor to convert the light reflected from the original document, an A/D converter for A/D conversion of electric signals, etc., and optically reads out image data from the original document sheet on the original platen.

Paper feeding section 14 houses recording sheets, and feeds out the recording sheets into image forming section 16.

Image forming section 16 is comprised of elements which are necessary to form images in the image forming apparatus utilizing an imaging process of an electrophotographic system or an electrostatic recording system, such as a photoreceptor, a transfer belt, a fixing unit, and various conveying belts. Image forming section 16 forms an image on the recording sheet based on the image data read from image reading section 13 or the print data received via communication I/F section 11*d*, and sends it to image outputting section 17.

Display/operation section 15 enables various settings with respect to the printing job. Further, in cases where watermark printing to embed a color watermark into a monochrome original document is indicated, display/operation section 15 displays a warning screen as necessary, and functions as a selection section which displays such that whether to count the job as color printing or to count as monochrome printing is selectable. This display/operation section 15 is a touch panel and is capable of various operations. This operation function may be placed at almost anywhere capable of providing the operation function not restricted on the touch panel.

Image outputting section 17 outputs recording sheets conveyed from image forming section 16 after applying any finishing processing required by a user, such as punching, stapling, and/or bookbinding, based on the instructions from control section 11.

FIG. 1 and FIG. 2 show an example of image forming apparatus 10 of the present embodiment, which is necessary to be capable of watermark printing and count control thereof, while ADF 12, image reading section 13, or image outputting section 17, etc. may be omitted.

In the following, the print procedure utilizing the image forming apparatus configured as described above will be explained while referring to the flowchart of FIG. 3.

First, in case of copying, a user places a sheet of original document on ADF 12 or on the original platen of image reading section 13 of image forming apparatus 10, and operates display/operation section 15 to instruct copy-start, after which image reading section 13 reads the original document and outputs image data. While in case of network printing, image forming apparatus 10 receives print data described with a PDL (Page Description Language) such as PCL (Printer Control Language) or Post Script from a client server or a printer controller those connected a network through communication I/F section 11*d*. These image data, print data, and print instruction information are collectively called a print job. After that, in order to enable formed image output printing, image forming apparatus 10 feeds a recording sheet from indicated paper feed section 14.

A print job is structured with job information, page information those shown in FIG. 4, and image data, for example, comprising four colors of YMCK. The job information comprises job ID to discriminate each job, type of the job, user name, job name, number of page, number of print set, binding direction, stapling method, and the like. The page information comprises image size for each page, recording paper size, recording paper type, color mode, image direction, assignment of paper feeding section, discrimination of single sided/double sided printing, settings of watermark, and the like. The print job is temporarily stored in memory 11b, and is transformed on memory 11b into data capable of image formation on the recording paper, in image forming section 16. Various programs for this transformation are stored in HDD 11c, and the required program is read out by CPU 11a.

After receiving the above-described print job (S101, Yes), control section 11 analyzes the job information included in the print job (in step S102) on memory 11b, and subsequently analyzes the page information (in step S104).

After the image formation in step S105 and the image outputting in step S106 are conducted, in step S107 control section 11 discriminates the color mode and the color of watermark based on the page information, executes a monochrome count in step S108 or a color count in step S109 based on the result of discrimination, and creates the counter information shown in FIG. 5(a). The counter information is the information of number of printed recording sheets actually printed and outputted by the image forming apparatus, and comprises counts classified to copying or printing, and counts classified respectively to monochrome or color, in addition to the count of total printed sheets.

Under normal circumstances, the counter information of FIG. 15 is supposed to be counted based on "color mode" in the page information of FIG. 4. However, even if the original document being monochrome, in cases when a color watermark is added, the image forming apparatus executes the image formation with color mode and counts it as color printing since the watermark is actually printed with color toner/ink. As a result an inconvenience arises where, although the printed image visually appears as monochrome, the print is counted as color printing.

In the present embodiment, according to the view point that the watermark is essentially "invisible by naked eye", in step S107, control section 11 does not increment the count according to the "watermark color" in the page information of FIG. 4, but counts based on the state indicated in the "color mode". For example, since in FIG. 4 the page information for the first page is: "color mode"=monochrome, the control section increments the counter information in the "monochrome" as shown in FIG. 5(b), in step S108.

In this way when ejection of one page of printed sheet and count for the page are completed, returning to step S103, a similar process is repeated for all pages (step S110).

In this way, in the case of combination of a monochrome original document and a color watermark, by counting it as monochrome printing, which is identical to the user's view, the inconvenience of disagreement can be eliminated in counting between the prints of visually conceived and actually conducted.

In the description above, as in the case of a combination of monochrome original document and color watermark, the count is fixed to monochrome count. It is also preferable to display a warning screen on display/operation section 15 of image forming apparatus 10 in the case of this combination, and to allow a user to select "color count" or "monochrome count".

Further, in addition to monochrome and color counters, by providing an exclusive watermark counter {namely a security (watermark) counter} as shown in FIG. 6, in the case of a combination of monochrome original document and color watermark, it is also preferable to count into the security (watermark) counter instead of the monochrome counter. This security (watermark) counter is independent from conventional counters of respective color, and is the counter which is used in the case of printing with an added function (namely the security function in this case).

Second Embodiment

Figure 7:
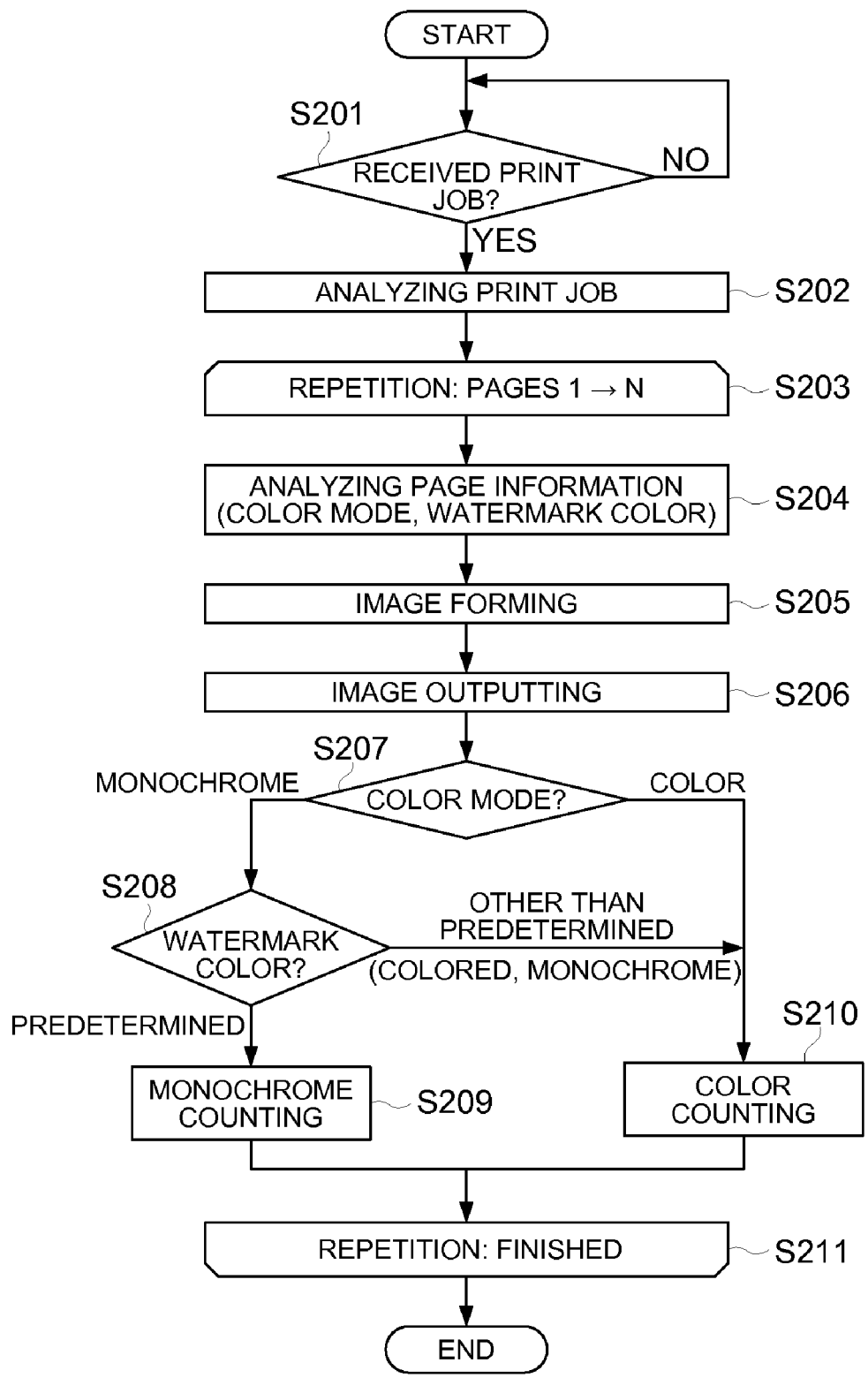
FIG. 7 is a flow chart showing a print procedure using the image forming apparatus pertaining to the second embodiment of the present invention.

Referring to FIGS. 7-11, an image forming apparatus and a count control method pertaining to the second embodiment will now be explained. FIG. 7 shows a flow chart of a print procedure using the image forming apparatus of the present embodiment. FIG. 8 shows an example of a print job, FIGS. 9(a)-10(b) show examples of counter information, and FIG. 11 shows an example of watermark setting.

As described above, in the case of printing by embedding a watermark into the original document, an inconvenience arises by counting the print whether as color print or as monochrome print. For example, in an organization such as a business corporation, there are cases where watermark printing is made mandatory. In such case, parameters of the watermark in the page information of FIG. 8 are set as "predetermined". Further, from the view point of suppressing the execution of watermark printing other than the predetermined setting, there may be cases where counting the print as monochrome is not appropriate. Therefore, in the present embodiment, even in cases of printing with "monochrome original document+watermark OFF" setting or a "monochrome original document+monochrome watermark" setting, control section 11 controls to count the print as color print, with the intention of applying a heavy charge.

Hereinafter, the print procedure of the present embodiment will be explained while referring to the flowchart of FIG. 7.

When receiving the print job (step S201, Yes), control section 11 analyzes, on memory 11b, the job information included in the print job shown in FIG. 8 (step S202), and subsequently analyzes the page information (step S204).

After the image forming (step S205) and the image outputting (step S206) are conducted based on the job information and the page information, in step S207, control section 11 discriminates the color mode based on the page information, and in case of the color mode being "monochrome", discriminates the watermark color based on the page information in step S208. And control section 11 executes a monochrome count (step S209) or a color count (step S210), and creates the counter information as shown in FIG. 9(a).

Specifically, in cases where the "color mode" of the page information is "color" (color in step S207), the counter information is incremented as "color" (step S210) in either cases of "watermark color" being "predetermined", "colored", or "monochrome".

Further, in cases where the "color mode" of the page information is "monochrome" (monochrome, in step S207) and the "watermark color" is "predetermined" (predetermined, in step S208), the counter information is incremented as "monochrome" (step S209).

On the other hand, in cases where the "color mode" of the page information is "monochrome" (monochrome, in step S207) and the "watermark color" is "other than predetermined (colored, monochrome)" (other than predetermined, in step S208), in order to apply a heavy charge for the execution of watermark printing with a setting other than the predetermined, the counter information is incremented in "color" as shown in FIG. 9(b) (step S210). Further, in the case of not printing a watermark, which being other than predetermined setting, the counter information is similarly incremented as "color".

The "predetermined" here means the preliminary determined setting in the side of image forming apparatus by an administrator of image forming apparatus 10, and the like, and the predetermined setting is registered, for example, as "watermark=ON", "watermark character string=FOR INTERNAL USE ONLY", "watermark pattern=arabesque", "watermark color=cyan" as shown in FIG. 11. Such information is stored in HDD 11c readout as necessary and is compared, on memory 11b, whether it is coinciding with the "watermark", "watermark character string", "watermark pattern", and "watermark color" of the page information.

In this way when an ejection of one page of the printed sheet and a counting for the page are completed, returning to step S203, the similar process is repeated for all pages (step S211).

In this way, by counting as color printing even for the monochrome original document when the watermark setting does not coincide with the predetermined setting in the image forming apparatus, it becomes possible to apply a light charge in cases where a printing is executed based on the predetermined watermark setting which is mandatory according to the company policy, and apply a heavy charge in cases where the printing is executed with the watermark setting outside of the company policy. This enables to suppress the printing with the setting other than the predetermined.

In the present embodiment, shown is the configuration where in order to apply a heavy charge, when the printing is executed with the watermark setting outside of the company policy, the print is counted as the color printing. However, another configuration is also applicable where an exclusive counter (counter for the print other than predetermined setting) for counting the print executed with the setting other than the predetermined setting, is provided in addition to color and monochrome counters as shown in FIGS. 10(a)-(b), and when a print is executed with the setting other than the predetermined, the print is counted in the exclusive counter instead of being counted in the color counter.

In the above-described second embodiment, following configurations of (1)-(4) are included.

(1) An image forming apparatus, having a watermark printing function which prints an original document by embedding a watermark including a character or a pattern inconspicuously into an image of the original document, and having a control section, wherein the control section is provided with: a discrimination section which discriminates a color mode of the original document to be printed; and a counting section, which counts a number of printed sheet as monochrome printing, regardless of watermark color, in cases where the color mode is monochrome and a setting of the watermark printing is different from a predetermined setting.

(2) In the above-described image forming apparatus of (1), characterized in that the counter section, in addition to counting the number of printed sheets as monochrome printing, separately counts the number of printed sheet whose setting of watermark printing is different from the predetermined setting.

(3) The control method in an image forming apparatus, having a watermark printing function which prints an original document by embedding a watermark including a character or a pattern inconspicuously into an image of the original document, the cont control method including: a step of discriminating a color mode of the original document to be printed; and a step of counting a number of printed sheet as monochrome printing, regardless of watermark color, in cases where the color mode is monochrome and a setting of the watermark printing is different from a predetermined setting.

(4) In the above-described count control method of (3), the counting step, in addition to counting the number of printed sheets as the monochrome print, separately counts the number of printed sheet whose setting of watermark printing is different from the predetermined setting.

Third Embodiment

With reference to FIGS. 12-13, an image forming apparatus and a count control method pertaining to the third embodiment will be explained. FIG. 12 is a flow chart showing a print procedure using the image forming apparatus of the present embodiment. FIG. 13 shows an example of a print job.

In the above-described embodiments 1 and 2, described is the case where printing is executed by embedding a watermark into an original document, namely the case of forming an original document as a hard copy embedded with the watermark. Even in cases where copying of the original document of the hard copy embedded with the watermark is executed, an inconvenience arises according to whether the copy is counted as color printing or as monochrome printing. For example, in cases where a user tries to copy without knowing an existence of the watermark, an inconvenience arises that the copy is counted as color printing against user's intention, when the original document is monochrome and the watermark is colored. Therefore, in the present embodiment, control section 11 controls to count as monochrome printing in cases where the original document is monochrome, even when the watermark is colored.

Hereinafter, the print procedure of the present embodiment will be explained with reference to the flowchart of FIG. 12.

When a user places an original document embedded with a watermark on ADF 12 or on the original platen of image reading section 13 of image forming apparatus 10, and operates display/operation section 15 to set various copy settings and instruct copy start (S301), then control section 11 sets the copy settings having been set by display/operation section 15 into the print job shown in FIG. 13 (step S302).

In this case, for the "job type" of the print job, "copy" is set, parameters in the job information and page information change a little from the case of the above-described embodiment where "job type"="print". Specifically, in the case of "job type"="print", parameter of "watermark" indicates the condition how the watermark is to be embedded, while, in the case of "job type"="copy", there is usually no need to be conscious about the "watermark". Namely, the original document is optically read, and due to a normal image formation with screen processing, etc, no watermark appears in cases where the watermark is not embedded in the original document, and the watermark appears conspicuously in cases where the watermark is embedded.

In the present embodiment, in the page information, parameters of "watermark: existing/non-existing" and "watermark color: colored/monochrome" are prepared. After reading the original document (step S304), control section 11 detects the watermark and discriminates the watermark color (step S305), and sets the detected and discriminated parameters in columns of "watermark" and "watermark color" (step S306) as shown in FIG. 13 for example. In cases where original documents are placed on ADF 12, the original document are conveyed sheet by sheet into image reading section 13, and the processing from step S304 to step S306 are executed.

Whether a watermark exists or not, can be detected by recognizing a watermark pattern. For example, a watermark pattern is previously registered in HDD 11c of image forming apparatus 10, and whether the watermark is printed in the original document can be discriminated by cross-checking the pattern detected from the original document with the registered watermark pattern on memory 11b.

Meanwhile, in cases where the original document embedded with a watermark is optically read, the color of the original document is recognized as "color" when the watermark is colored even if the original document itself is monochrome. Therefore, after detecting the watermark pattern and the watermark color, by executing color discrimination of the area excluding the watermark color, a color of the original document itself is discriminated. For example, in cases where the watermark color is cyan, control section 11 discriminates the color of the area other than cyan area, and if it is "colored", discriminates as the color original document, and if it is "monochrome", discriminates as the monochrome original document, and sets this discriminated color of the original document in the column of "color mode" of the page information.

However, in the present embodiment, since counting is executed based on the color of original document regardless of watermark color, detection of the watermark and discrimination of the watermark color are not necessary for the counter control.

And, when the processing for the original document on ADF 12 or on image reading section 13 is finished, the repetition processing from step S303 is completed (step S307).

Next, control section 11 analyzes the job information included in the print job shown in FIG. 13 (step S308), and subsequently analyzes the page information (shown in FIG. 13) page by page (step S310).

After executing the image formation (step S311) and the image outputting (step S312) based on the job information and the page information, in step S313, control section 11 discriminates the color mode based on the page information, and creates the counter information by executing monochrome counting (step S314) or color counting (step S315) based on the discrimination result.

Here, the parameter indicated in "color mode" of the page information is a color of the original document excluding the watermark, and this parameter is usually added into the counter information. Namely, in cases where a color watermark is printed into an original document, since the printing is actually conducted with color toner or ink, the image forming apparatus executes the image formation in color mode, and the count is executed as a color. However, in the present embodiment, according to the view point that the watermark is essentially 'invisible by naked eye', the controller controls to count based on the parameter indicated in "color mode" without taking account of "watermark color".

In this way when ejection of the first page of printed sheet and the count for the page are completed, returning to step S309, the similar process is repeated for all pages (step S316).

In this way, an inconvenience, in which the print is counted as color printing in cases where an invisible color watermark is printed in a monochrome original document, is eliminated by counting as a color count or a monochrome count based on the color mode of the original document.

In the above description, in the case of combination of "monochrome original document+color watermark", counting is fixed to monochrome count. However, in the case of this combination, the other configuration is applicable where a user can select to set "color count" or "monochrome count" through display/operation section 15 of image forming apparatus 10. As one user-selectable configuration, a setting of whether to set as "color count" or as "monochrome count" is preliminary selected, and for all copies regarding the original document of "monochrome original document+color watermark" combination, the preliminary selected counting is applied. And, the other applicable user selectable configuration is the one where every time of copying the original document of "monochrome original document+color watermark" combination, display/operation section 15 displays to the effect that the combination is "monochrome original document+color watermark". And by receiving the user's instruction (selection) of whether to copy as color or as monochrome, the color count or the monochrome count is executed based on the instruction.

In each embodiment described above, explained is the cases where the watermark is actually printed on a recording sheet, however, the present invention is not restricted to the above described embodiment. And the similar counter control can be applied to the cases where the "watermark", is not actually printed on the recording sheet, but is electrically held. For example, there is a technology where a recording medium such as an IC tag is embedded into an original document, and when copying the original document, by reading out an image held in the IC tag, printing an overlay image like a printed watermark, and the similar counter control described above can be applied also to the case of this technology.

The present invention is applicable to an image forming apparatus capable of watermark printing and a count control method thereof.

According to the image forming apparatus and the count control method of the present invention, in the case of copying an original document in which a watermark is embedded, or in the case of printing the original document by embedding a watermark, since the counting is controlled to count whether as color print or as monochrome print based on a predetermined rule, inconveniences arising in the case of printing the watermark can be eliminated.

What is claimed is:

1. An image forming apparatus which copies on a recording sheet an original document carrying a watermark, where a watermark comprising a specific character or a pattern is embedded inconspicuously into an image of the original document, the image forming apparatus comprising:
    a discrimination section which discriminates a color mode of the original document and a color of the watermark;
    an image forming section which copies on the recording sheet an image of the original document carrying the watermark with the color mode based on the color mode of the original document and the color of the watermark discriminated by the discrimination section; and
    a counting section which counts a number of copied sheets as monochrome printing in cases where the discrimination section has discriminated the color mode of the original document as monochrome and has discriminated the color of the watermark as colored, and the image forming section has copied the original document carrying the watermark by the color mode of "color."

2. The image forming apparatus of claim 1, wherein the counting section further counts the number of copied sheets separately as watermark printing in cases where the discrimination section has discriminated the color mode of the original document as monochrome and has discriminated the color of the watermark as colored, and the image forming section has copied the original document carrying the watermark by the color mode of "color."

3. An image forming apparatus which copies on a recording sheet an original document carrying a watermark, where a watermark comprising a specific character or a pattern is embedded inconspicuously into an image of the original document, the image forming apparatus comprising:
- a discrimination section which discriminates a color mode of the original document and a color of the watermark;
- an image forming section which copies on the recording sheet an image of the original document carrying the watermark with the color mode based on the color mode of the original document and the color of the watermark discriminated by the discrimination section; and
- a selection section which selects whether to count a number of copied sheets as monochrome printing or as color printing, in cases where the color mode of the original document is monochrome, and the color of the watermark is colored; and
- a counting section which counts the number of copied sheets as monochrome printing or as color printing based on a result of selection by the selection section, in cases where the discrimination section has discriminated the color mode of the original document as monochrome and has discriminated the color of the watermark as colored, and the image forming section has copied the original document carrying the watermark by the color mode of "color."

4. The image forming apparatus of claim 3, wherein the counting section further counts the number of copied sheets separately as watermark printing in cases where the discrimination section has discriminated the color mode of the original document as monochrome and has discriminated the color of the watermark as colored, and the image forming section has copied the original document carrying the watermark by the color mode of "color."

5. A count control method for an image forming apparatus which copies on a recording sheet an image of an original document carrying a watermark with a color mode based on a color mode of the original document and a color of the watermark of the original document carrying the watermark, where a watermark comprising a specific character or a pattern is embedded inconspicuously into an image of the original document, the count control method comprising the steps of:
- discriminating a color mode of the original document and a color of the watermark; and
- counting a number of copied sheets as monochrome printing and incrementing counter information of the monochrome printing, in cases where the discriminating step has discriminated the color mode of the original document as monochrome and has discriminated the color of the watermark as colored, and the image forming apparatus has copied the original document carrying the watermark by the color mode of "color."

6. The count control method of claim 5, further comprising the step of separately counting the number of copied sheets as watermark printing, in cases where the discriminating step has discriminated the color mode of the original document as monochrome and has discriminated the color of the watermark as colored, and the image forming apparatus has copied the original document carrying the watermark by the color mode of "color."

7. A count control method for an image forming apparatus which copies on a recording sheet an image of an original document carrying a watermark with a color mode based on a color mode of the original document and a color of the watermark of the original document carrying the watermark, where a watermark comprising a specific character or a pattern is embedded inconspicuously into an image of the original document, the count control method comprising the steps of:
- discriminating a color mode of the original document and a color of the watermark;
- selecting whether to count a number of copied sheets as monochrome printing or as a color printing, in cases where the color mode of the original document is monochrome, and the color of the watermark is colored; and
- counting the number of copied sheets as monochrome printing or as color printing based on a result of selection by the selecting step and incrementing counter information of the monochrome printing or color printing, in cases where the discriminating step has discriminated the color mode of the original document as monochrome and has discriminated the color of the watermark as colored, and the image forming apparatus has copied the original document carrying the watermark by the color mode of "color."

8. The count control method of claim 7, further comprising the step of separately counting the number of copied sheets as watermark printing, in cases where the discriminating step has discriminated the color mode of the original document as monochrome and has discriminated the color of the watermark as colored, and the image forming apparatus has copied the original document carrying the watermark by the color mode of "color."

9. An image forming apparatus provided with a watermark printing function where a watermark comprising a specific character or a pattern is embedded inconspicuously into an image of an original document, the image forming apparatus comprising:
- a discrimination section which discriminates a color mode of the original document and a color of the watermark;
- an image forming section which forms on the recording sheet an image of the original document carrying the watermark with the color mode based on the color mode of the original document and the color of the watermark discriminated by the discrimination section; and
- a counting section which counts a number of copied sheets as monochrome printing in cases where the discrimination section has discriminated the color mode of the original document as monochrome and has discriminated the color of the watermark as colored, and the image forming section has copied the original document carrying the watermark by the color mode of "color."

10. The image forming apparatus of claim 9, wherein the counting section further counts the number of copied sheets separately as watermark printing in cases where the discrimination section has discriminated the color mode of the original document as monochrome and has discriminated the color of the watermark as colored, and the image forming section has copied the original document carrying the watermark by the color mode of "color."

11. An image forming apparatus provided with a watermark printing function where a watermark comprising a specific character or a pattern is embedded inconspicuously into an image of an original document, the image forming apparatus comprising:
- a discrimination section which discriminates a color mode of the original document and a color of the watermark;
- an image forming section which forms on the recording sheet an image of the original document carrying the watermark with the color mode based on the color mode of original document and the color of the watermark discriminated by the discrimination section;

a selection section which selects whether to count a number of copied sheets as monochrome printing or as color printing, in cases where the color mode of the original document is monochrome, and the color of the watermark is colored; and a counting section which counts the number of copied sheets as monochrome printing or as color printing based on a result of selection by the selection section, in cases where the discrimination section has discriminated the color mode of the original document as monochrome and has discriminated the color of the watermark as colored, and the image forming section has copied the original document carrying the watermark by the color mode of "color."

12. The image forming apparatus of claim 11, wherein the counting section further counts the number of copied sheets separately as watermark printing in cases where the discrimination section has discriminated the color mode of the original document as monochrome and has discriminated the color of the watermark as colored, and the image forming section has copied the original document carrying the watermark by the color mode of "color."

13. A count control method for an image forming apparatus which is provided with a watermark printing function and forms on a recording sheet an image of an original document carrying a watermark with a color mode determined based on a color mode of the original document and a color of the watermark of the original document carrying the watermark, where a watermark comprising a specific character or a pattern is embedded inconspicuously into an image of the original document, the count control method comprising:

discriminating a color mode of the original document and a color of the watermark; and counting a number of copied sheets as monochrome printing and incrementing counter information of the monochrome printing in cases where the discriminating step has discriminated the color mode of the original document as monochrome and has discriminated the color of the watermark as colored, and the image forming apparatus has copied the original document carrying the watermark by the color mode of "color."

14. The count control method of claim 13, further comprising the step of separately counting the number of copied sheets as watermark printing, in cases where the discriminating step has discriminated the color mode of the original document as monochrome and has discriminated the color of the watermark as colored, and the image forming apparatus has copied the original document carrying the watermark by the color mode of "color."

15. A count control method for an image forming apparatus which is provided with a watermark printing function and forms on a recording sheet an image of an original document carrying a watermark with a color mode determined based on a color mode of the original document and a color of the watermark of the original document carrying the watermark, where a watermark comprising a specific character or a pattern is embedded inconspicuously into an image of the original document, the count control method comprising:

discriminating a color mode of the original document and a color of the watermark;

selecting whether to count a number of copied sheets as monochrome printing or as a color printing, in cases where the color mode of the original document is monochrome, and the color of the watermark is colored; and counting the number of copied sheets as monochrome printing or as color printing based on a result of selection by the selecting step and incrementing counter information of the monochrome printing or color printing, in cases where the discriminating step has discriminated the color mode of the original document as monochrome and has discriminated the color of the watermark as colored, and the image forming apparatus has copied the original document carrying the watermark by the color mode of "color."

16. The count control method of claim 15, further comprising the step of separately counting the number of copied sheets as watermark printing, in cases where the discriminating step has discriminated the color mode of the original document as monochrome and has discriminated the color of the watermark as colored, and the image forming apparatus has copied the original document carrying the watermark by the color mode of "color."

* * * * *